INVENTORS
EULAS R. ATKINSON
JOSEPH T. STEWART JR.

AGENT

United States Patent Office 3,508,738
Patented Apr. 28, 1970

3,508,738
VALVE
Eulas R. Atkinson, Sugar Land, and Joseph T. Stewart,
Jr., Houston, Tex., assignors to ACF Industries, Incorporated, New York, N.Y., a corporation of New Jersey
Filed May 2, 1966, Ser. No. 546,748
Int. Cl. F16k 5/06, 5/20
U.S. Cl. 251—315                                  8 Claims

ABSTRACT OF THE DISCLOSURE

A spherical plug valve having seat assemblies comprised of a seat ring and a retainer ring which interfit to define an annular groove having a generally triangular cross sectional shape and having a restricted annular opening. An annular resilient sealing member having a generally triangular cross sectional shape is disposed within the annular groove with an annular portion thereof extending from the restricted opening for sealing engagement with the working surface of a spherical rotary plug member. The sealing member is so related to the seat ring and retainer ring that specific annular areas of high compression are developed at the inner peripheral portion of the sealing member to establish fluidtight seals between the sealing member and the retainer ring and between the sealing member and the innermost portion of a base surface defined on the seat ring thereby preventing fluid pressure from getting behind the sealing member.

---

This invention relates generally to valves for controlling fluid flow and more particularly to spherical plug valves operating under high pressure conditions and utilizing sealing means incorporating elastomeric material.

Elastomeric materials, such as natural rubber or one of numerous synthetic rubberlike materials, have historically been considered superior sealing materials in most valve applications. Rubber or rubberlike synthetic materials, hereinafter referred to as elastomeric sealing materials, are considered desirable in most noncorrosive valve applications because they are inexpensive to obtain and because they have an inherent ability to conform to most surfaces to produce an effective seal even though the surface may not be exceptionally smooth. When utilizing elastomers for sealing elements in valves, therefore, the machining cost for producing the sealing surfaces of the valve may be kept at a minimum. Since elastomer materials will distort under low pressure and will conform to minute irregularities in the sealing surfaces of the valve plug, an effective seal may be formed even though the line pressure of the valve is very low. Elastomer sealing members, therefore, are inherently adapted for both high and low line pressure operation when properly contained.

Although elastomer materials are superior for their sealing ability at both high and low pressures, a number of serious disadvantages exist which have prohibited the application of unsupported elastomer materials to both high and low pressure conditions which is known in the industry as "full range" valve application. A soft elastomer sealing material provides a better seal than most other sealing materials due to its inherent ability to conform to the sealing surface of the valve, but when utilized in a high pressure system where it must carry very high loads, the elastomer sealing material tends to deform excessively, thus allowing excessive movement of the valve elements in a downstream direction.

Under high pressure conditions, elastomer O-ring type sealing members may easily be blown from the seat recess and carried into the downstream line by the lading. The elastomer material, being easily deformed, is also highly susceptible to extrusion into a position where it may be engaged and severed or otherwise damaged by the plug member upon its movement between open and closed positions.

In an effort to provide valves which will function at both low and high pressure ranges, the valve industry has recently turned to a number of plastic materials which recently have been developed for use as sealing materials. Among these plastic materials are polytetrafluoroethylene which is sold under the registered trademark "Teflon" by the E. I. du Pont de Nemours & Company, and a fully saturated fluorocarbon copolymer of chlorotrifluoroethylene and vinylidene fluoride, which is manufactured by the Minnesota Mining and Manufacturing Company and sold under the registered trademark "Kel–F." While plastic materials such as those indicated above have been quite satisfactory for high pressure valve applications, they have been generally unsatisfactory in high and low or "full range" pressure applications. Fluorocarbon plastic materials as well as other relatively hard plastic materials are generally considered unsatisfactory for full range pressure service primarily because of the cost involved. Generally, there is a relatively large amount of sealing surface contact area involved in effecting a positive seal between the valve seat and the plastic sealing member of a valve. The plastic materials, which are sufficiently hard to carry forces applied thereto at high pressures, because of the large surface contact area, are unable to deform at low pressures sufficiently to conform to standard surface irregularities of the metal sealing surface to effect a fluid tight seal. The metal sealing surface in valves for both high and low pressure applications, therefore, must be maintained within extremely close tolerances and must be highly polished to eliminate surface irregularities before adequate sealing can be expected at low pressure operation. The cost of manufacturing such valves becomes prohibitive when tolerances are reduced thereby adversely affecting the competitiveness of the product. Fluorocarbon plastic materials are also undesirable for combined low and high pressure applications because not only do they fail to conform to the sealing surfaces of the valve at low pressure conditions due to their nonresilience, but if deformed at high line pressures, the plastic material can take a set and will not return to its original shape, thus making a subsequent low pressure seal highly improbable.

The instant invention contemplates, as one of its primary objects, the utilization of both elastomeric and plastic sealing materials for full range pressure service as will be described in detail hereinbelow.

In an effort to utilize the superior sealing qualities of elastomer materials and to eliminate the problems which arise due to overdistortion of the elastomer materials in high pressure valve applications, seat assemblies of valves have been developed which are generally composed of metallic substance and which retain or contain an elastomer sealing element in an annular groove formed therein. Overdistortion of the elastomeric sealing member is effectively prevented since the metallic seat assemblies are adapted to engage the plug member. Contained elastomer type seat assemblies have been developed which include inner and outer interlocking seat rings formed of metallic substance fitted together to define an annular groove for retaining an O-ring type elastomer sealing member. The outer portions of the groove are generally restricted by annular lip members formed respectively on the inner and outer ring members and which lips are radially spaced considerably less than the cross sectional diameter of the O-ring. A portion of the elastomer O-ring member generally extends through the space between the lip members and into engagement with the working surface of the valve member to establish a seal therewith. The depth of the groove is generally less than the cross sectional diameter of the O-ring sealing member whereby the outer surface of the sealing member is urged between the lip portions and into sealing engagement with the working surface of the valve member. The radial dimension of the groove is generally considerably larger than the cross sectional diameter of the sealing member whereby the sealing member may be completely displaced within the groove by the valve members or by the pressurized lading upon application of high pressure to the valve. While containing O-ring type elastomer seat arrangements are generally satisfactory under moderate pressure conditions, serious disadvantages occur under higher pressure conditions which makes their worth questionable. Even though the lip portions of the seat assembly tend to retain the O-ring sealing element within the groove at high pressure conditions, especially during opening and closing of the valve, the O-ring sealing member may be extruded or blown by the extreme turbulence caused by opening or closing the valve into a position where it will be engaged and severed or otherwise damaged by the plug member as the edge of the valve bore or flow passage moves past the sealing member. At extremely high line pressure conditions the sealing member may be readily blown or extruded from its contained seat or containing groove and will be carried downstream by the lading or will remain trapped within the valve body.

A primary reason for the inability of elastomeric retained O-ring type sealing members to withstand the effects of high pressure is because the seal between the O-ring and the bottom surface of the seat groove is established at the point of tangency therebetween. As the O-ring is expanded radially by the pressurized fluid controlled by the valve the sealing point also moves outwardly and the fluid pressure is allowed to get behind the center of mass of the sealing member. Under this condition it is quite easy for the pressurized fluid to extrude the sealing member through the restricted groove opening into a position for shearing engagement by the spherical plug as discussed above. To reduce the possibility of extruding or blowing the sealing member from its containing groove, valve seats have been developed which include a bleed orifice formed in the seat member to communicate the outer periphery of the O-ring retaining groove with the valve body. Therefore, under high line pressure conditions the elastomer O-ring sealing member is forced to expand radially outwardly and the outer annular lip may force the sealing member to break its sealing engagement with the working surface of the plug member. If the pressure in the valve body is higher than the line pressure the sealing member will be forced by the pressurized lading to contract and move radially inwardly toward the bore of the plug and will break sealing engagement with the working surface of the plug member.

A disadvantage in the use of vented seat assemblies to retain O-ring type elastomer sealing members is the large distance radial movement traversed by each of the O-ring sealing members under varying conditions of pressure within the valve itself. Since the elastomer sealing members are repeatedly stretched and compressed, as the pressure changes within the valve, wear on the sealing member will be accelerated and the sealing members must accordingly be frequently replaced.

Accordingly it is a primary object of the present invention to provide a novel spherical plug valve which employs seat units defining nonvented grooves and which grooves retain a sealing member formed of elastomer or plastic materials.

An additional object of this invention includes the provision of a novel spherical plug valve having seat units utilizing entrapped or contained elastomer or plastic sealing members and which effectively prevent shearing or other damage to the sealing members upon opening or closing movement of the plug member.

An additional object of this invention includes the provision of a novel spherical plug valve construction incorporating elastomeric or plastic sealing members which are positively retained within seat grooves at all pressure ranges of valve operation.

It is among the objects of the invention to provide a novel spherical plug valve construction having seat assemblies provided with elastomeric or plastic sealing members wherein the seat assemblies and sealing members cooperate to develop high bearing load and initial sealing contact at desired areas to promote increased sealing ability of the sealing member in response to increase in valve pressure.

It is a further object of this invention to provide a novel spherical plug valve having elastomeric contained sealing members which prevent fluid pressure from getting behind the center of mass of the sealing members to eliminate the possibility of fluid pressure extrusion of the sealing members.

Other and further objects of this invention will become obvious upon an understanding of the illustrative embodiments about to be described, or will be indicated in the appended claims, and various advantages not referred to herein will occur to one skilled in the art upon employment of the invention in practice.

Briefly, the invention is directed to a spherical plug valve having seat assemblies which include contained elastomeric or plastic sealing members which are positively locked within the seat rings and which provide an adequate upstream seal at both low and high pressure ranges of valve operation. The sealing members cooperate with the seat assembly structure to establish areas of annular peripheral seal and to effectively utilize line pressure to increase the sealing ability of the sealing members.

Preferred embodiments of the invention have been chosen for purpose of illustration and description and are shown in the accompanying drawings, forming a part of the specification wherein.

Figure 1:
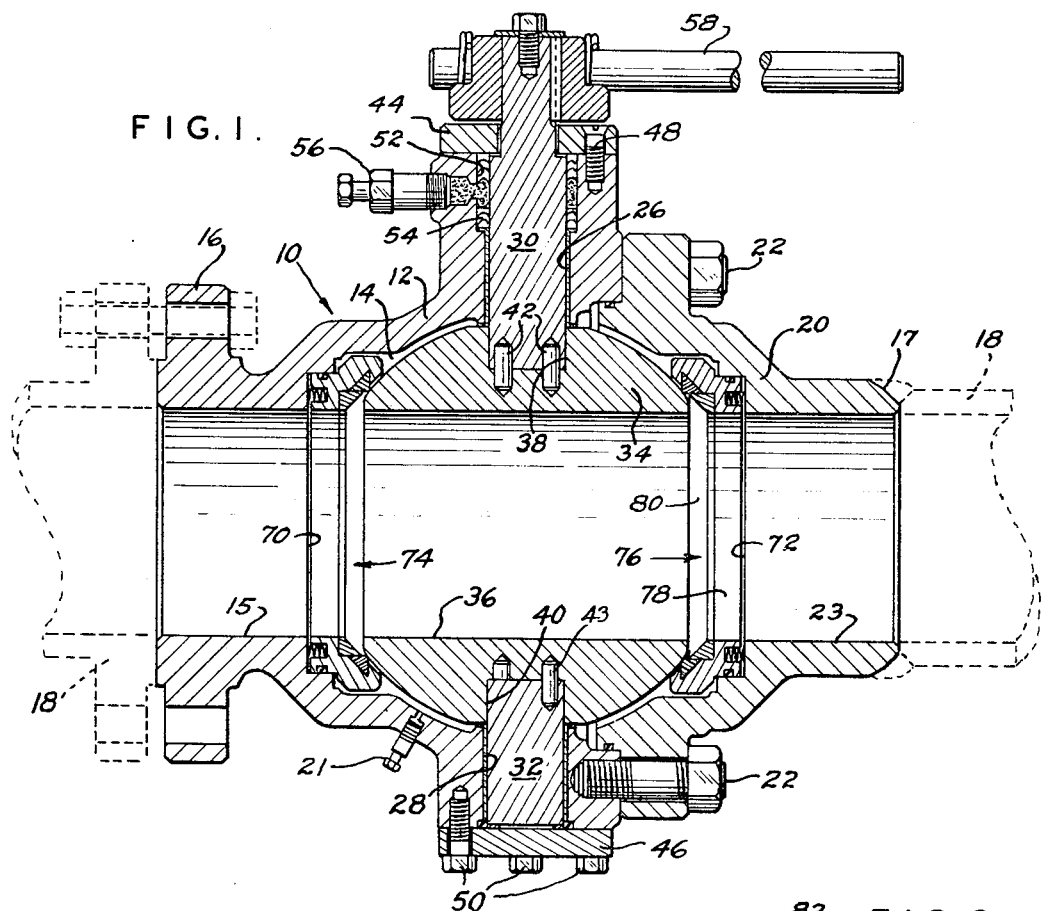
FIGURE 1 is an elevational view section illustrating a valve in accordance with the invention.

Referring now to the drawings for a more complete understanding of the invention, a valve which may be an end entry spherical plug valve, as illustrated at 10 in FIGURE 1, has a valve body portion 12 thereof defining a valve chamber 14. The body portion 12 of the valve 10 is formed with a flow passage 15 in fluid communication with the valve chamber. The valve body may be provided with a flange structure as shown at 16 in FIGURE 1 or it may be provided with a weld connection for either bolted or welded connection of the valve 10 to a pipeline 18. Other conventional methods of connection between the valve 10 and the pipeline 18 such as threaded connections, for example, may be employed without departing from the spirit or scope of this invention. An end closure portion 20 of the valve 10 is retained in sealed assembly with the valve body portion 12 by a series of bolts or threaded studs 22 and defines a closure for the valve chamber. The end closure member 20 is formed with a flow passage 23 which is in axial alignment with the flow passage 15. The end closure member 20 may be provided with a weld end structure 17 for welded connection thereof to a pipeline 18 or other suitable connection structures may be employed within the scope of the invention. The valve body 12 may be provided with a pressure relief fitting 21 for bleeding body pressure to the atmosphere if desired.

The valve body 12 is formed with aligned upper and lower bores 26 and 28 respectively, which receive upper and lower trunnion members 30 and 32, respectively, therein. A spherical plug member 34 having a flow passage 36 formed therein is rotatably positioned within the valve chamber 14 and is provided with oppositely disposed generally cylindrical bores 38 and 40 which receive the inner extremities of the trunnions 30 and 32. The plug member 34 is maintained in nonrotatable relation with the upper trunnion 30 by a pair of pin members 42 which fit within mating bores formed in the plug and in the trunnion 30. Pins 43 maintain a nonrotatable relation between the lower trunnion 32 and the spherical plug 34. Upper and lower cap plates 44 and 46 are fixed to the valve body 12 by a series of bolts 48 and 50, respectively, and serve as axial thrust supports for the upper and lower trunnions 30 and 32.

An enlarged bore 52 formed in concentric relation with the bore 26 in the valve body 12 cooperates with the cylindrical surface of the upper trunnion member 30 to define an annular packing chamber. A packing assembly 54 disposed within the packing chamber for the establishment of a fluid tight seal between the trunnion 30 and the valve body 12.

A packing adjustment fitting 56 is fixed to the valve body and disposed in communication with the packing chamber. In the event of leakage of the packing assembly such as might be caused by wear, semisolid packing material such as plastic, heavy grease or other packing sealants and lubricants may be forced into the packing chamber by manual adjustment of the fitting 56 to repressurize the packing and stop the leakage. Means for imparting rotary movement to the upper trunnion 30 such as an operating handle 58 is fixed or otherwise connected to the upper extremity of the upper trunnion 30. Rotation of the upper trunnion 30 by the handle structure 58 will, through the nonrotatable connection between the trunnion 30 and the spherical plug member 34, cause rotation of the plug member between its open and closed positions.

As illustrated in FIGURE 1 and forming an important part of this invention, the valve body 12 of the valve 10 is formed with a pair of seat recesses 70 and 72, each having seat assembly structures 74 and 76 respectively positioned therein. As illustrated in the drawings, each of the seat assemblies 74 and 76 comprises a seat ring 78 and a retainer ring 80 which interfit to define an annular generally triangular shaped seat groove 82 illustrated in detail in FIGURES 2-5 and 7.

Figure 2:
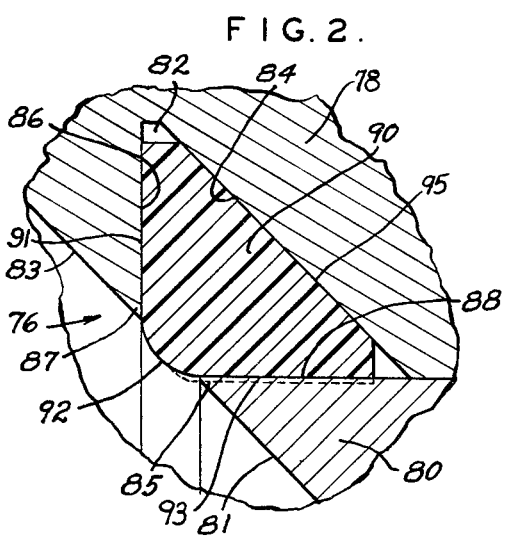
FIGURE 2 is a fragmentary sectional view of a seat assembly of the valve of FIGURE 1 illustrating the sealing member in its condition prior to assembly in the valve.

Referring particularly to FIGURE 2, the triangular groove 82 is formed by a frusto-conical base support surface 84 and a generally planar surface 86 formed in the retainer ring 78 which cooperate with a generally cylindrical surface 88 defined by the outer periphery of the retainer ring 80. The frusto-conical surface 84 and the planar surface 86 are formed by undercutting the inner circumference of the seat ring 78. The frusto-conical base support surface 84 is disposed generally parallel with a tangent to the spherical surface of the plug member 34 as viewed in cross section. The seat assembly is provided with a beveled face formed by a frusto-conical surface 81 on the retainer ring 80 and a frusto-conical surface 83 formed on the seat ring 78. The frusto-conical surfaces 81 and 83 cooperate respectively with surfaces 88 and 86 to define inner and outer lips 85 and 87 respectively. The lips 85 and 87 are slightly spaced to define a restricted opening for the annular groove 82.

An annular sealing member 90 having a cross sectional shape substantially complementary to the cross sectional shape of the annular groove 82 is disposed within the groove 82 and has an annular sealing portion 92 thereof extended through the annular restricted opening defined by the inner and outer lips 85 and 87 of the seat assembly.

The generally triangular cross sectional shape of the sealing member 90 is provided by an annular generally planar radial surface 91 and a cylindrical inner peripheral surface 93 which are generally right angularly disposed and separated by the curved annular sealing surface 92. A frusto-conical base surface 95 is formed at generally a 45 degree relationship with the planar surface 91 and the cylindrical surface 93 and is disposed for engagement with the frusto-conical base support surface 84. The sealing member is shaped relative to the seat groove such that annular spaces are defined at the inner angular portions of the groove 82 at either side of the base surface 95. The annular spaces provide space into which the material from which the sealing member is composed can flow as the sealing portion 92 thereof is displaced into the groove as discussed in detail hereinbelow.

As illustrated by dash lines in FIGURE 2, the sealing member 90 as viewed in cross section has a greater transverse dimension at the lower angular portion thereof than the transverse dimension of the seat groove. As the retainer ring 80 is interfitted with the seat ring 78 the resilient material defining the inner periphery of the sealing member is expanded radially by the cylindrical surface 88 of the retainer ring thereby compressing the inner peripheral portion of the sealing member between the cylindrical surface 88 and the frusto-conical base support surface 84. This compression develops an annular area of high compression between the sealing member and the base support surface 84 immediately adjacent the inner periphery of the sealing member thereby effecting a positive fluid tight seal at the area of high compression. The initial seal between the sealing member 90 and the frusto-conical surface 84 being at the inner periphery of the sealing member effectively precludes any possibility of fluid pressure getting behind the center of mass of the sealing member and thereby prevents the fluid pressure from extruding the sealing member through the annular restricted opening defined by the lips 85 and 87. The sealing point or annular sealing area between the sealing member and the frusto-conical base support surface is maintained inwardly of the center of mass of the sealing member at all times under all pressure conditions and the resultant fluid force acting upon the sealing member due to the triangular shape thereof merely increases the tendency of the sealing member to be retained within the annular seat groove.

Figure 3:
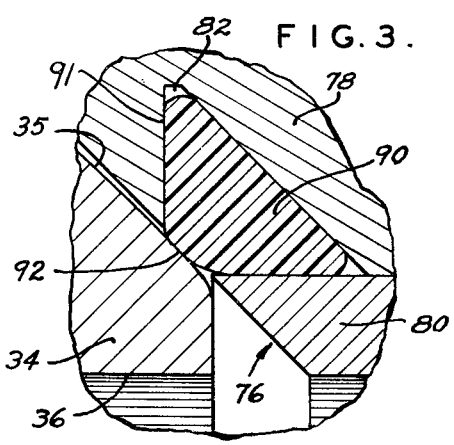
FIGURE 3 is a fragmentary sectional view of a seat assembly of FIGURE 1 illustrating the sealing member in its assembled condition.

As illustrated in FIGURE 3, contact between the spherical working surface 35 of the plug member 34 and the sealing surface 92 of the sealing members 90 will cause the sealing member to be compressed within the groove 82. Since the groove 82 and sealing member 90 define annular spaces at either side of the sealing member as discussed above, the sealing portion 92 of the sealing member 90 may be completely deformed within the groove 82 by the spherical plug member 34 without completely filling the groove. This feature allows the maintenance of a fluid tight seal between the sealing member 90 and the spherical plug at all pressure conditions without involving the possiblity of excessive deformation of the sealing member at high pressure conditions. It is possible under high pressure conditions for the seat assembly 76 to bear on the spherical surface 35 of the plug 34 with sufficient force to bring the frusto-conical face of the seat assembly into contact with the spherical surface 35. The spherical surface will force the sealing portion 92 of the sealing member 90 entirely within the seat groove causing the sealing material to flow into the annular spaces within the groove. The lips 85 and 87 of the seat assembly under this condition will carry the load between the seat assembly and the plug thereby preventing excessive compression of the sealing member. This prevents the sealing material from taking a set under overcompression and allows the sealing portion 92 of the sealing member to return to its original unpressurized condition subsequent to release of the fluid pressure causing the compression. The sealing portion 92 of the sealing member 90, because of its small annular sealing area will be sufficiently deformed to achieve a proper fluid tight seal with the spherical surface 35 of the plug member 34 at both high and low pressure conditions.

Figure 4:
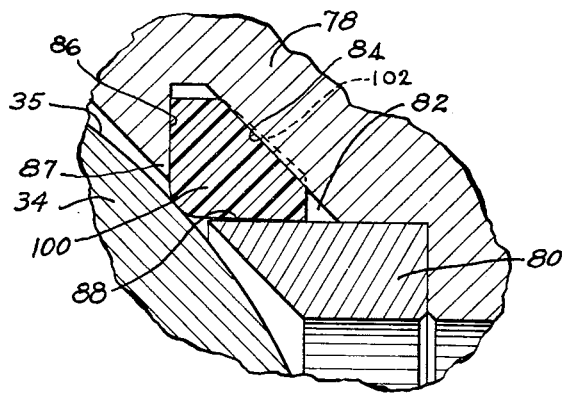
FIGURE 4 is a fragmentary sectional view of a modified embodiment of the invention.
Figure 5:
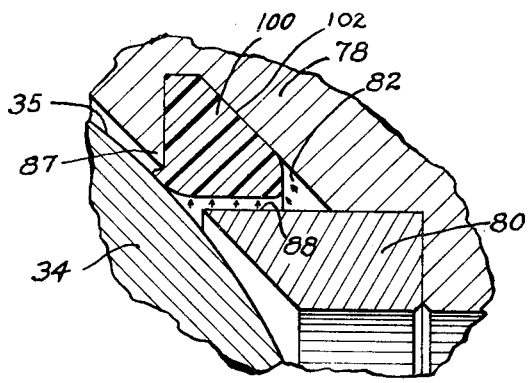
FIGURE 5 is a fragmentary sectional view illustrating the structure of FIGURE 4 under extremely high pressure.

With reference now to FIGURES 4 and 5, a modified embodiment of the invention is disclosed which is particularly adapted for extremely high pressure service and which will provide an adequate seal at low pressures. As illustrated in FIGURE 4, an annular sealing member 100 which is preferably formed of plastic material is disposed within the annular groove 82 in the same manner set forth above in regard to sealing member 90. The sealing member 100 is formed with an original cross sectional shape as illustrated by dash lines in FIGURE 4 and when disposed within the annular groove 82 is deformed to the shape and dimension of the walls 84, 86 and 88 defining the groove 82. In deforming the sealing member 100 from its dash line shape to its full line shape as illustrated in FIGURE 4, an extremely small annular area of high compression is developed between the frusto-conical surface 84 and the sealing member 100 at the inner periphery of the sealing member. This high bearing load, acting through the small area of contact between the sealing member and the seat surface, is effective to deform the plastic material causing it to conform to minor seat surface irregularities and to develop a positive fluid tight seal between the sealing member 100 and the frusto-conical surface 84. This small annular sealing area positively locates the initial sealing point or initial annular seal at the inner periphery of the base wall 102 of the seat member 100.

Under extremely high pressure conditions, the sealing member is suject to tensile deformation by the fluid bearing on the inner periphery thereof. There is a tendency for fluid under extremely high pressures to force the inner peripheral portion of the sealing member away from the cylindrical wall 88 of the annular groove as illustrated in FIGURE 5. Under these conditions, fluid under pressure ordinarily attempts to get behind the sealing member and extrude the sealing member outwardly of its groove through the annular restricted opening. This is prevented by the inner peripheral seal between the sealing member and the frusto-conical base support wall which under all conditions is located inwardly of the center of mass of the sealing member and prevents the fluid under pressure from getting behind the center of mass of the sealing member. Location of the initial seal between the sealing member 100 and the frusto-conical surface 84 at the inner periphery of the base surface and the corresponding shape of the sealing member 100 effectively cooperate not only to prevent fluid pressure from getting behind the seat as indicated above, but also to effectively aid in the maintenance of the inner peripheral seal. As illustrated by force arrows in FIGURE 5, fluid pressure acting upon the upstream seat of the valve forces the sealing member 100 to expand radially under tensile deformation thereby displacing the inner peripheral surface of the sealing member 100 away from the cyclindrical surface 88 of the retainer ring 80. It is apparent however because of the generally triangular cross sectional shape of the sealing member 100 that the force of the fluid at the more flexible inner periphery of the sealing member will force the inner peripheral portion of the sealing member into tighter engagement with the frusto-conical base surface 84, thereby positively aiding in maintenance of the inner peripheral seal. Cooperation between the cross sectional shape of the sealing member and initial high bearing loads at the inner periphery thereof effectively cooperate to prevent the pressurized fluid from forcing the initial sealing contact point beyond the center of mass of the sealing member. The sealing member under pressure of the valve fluid is therefore forced more tightly into the annular groove 82 rather than having a tendency to be forced outwardly thereof.

Figure 7:
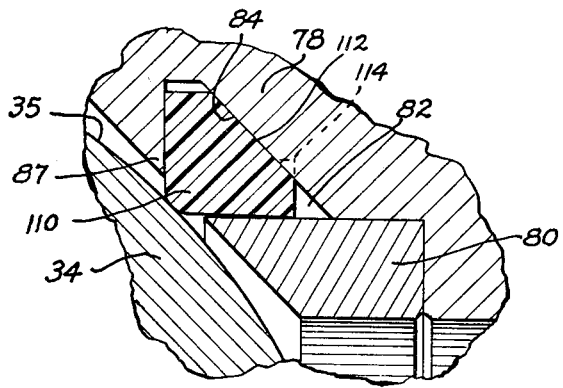
FIGURE 7 is a fragmentary sectional view of a seat assembly incorporating the sealing member of FIGURE 6.
Figure 6:
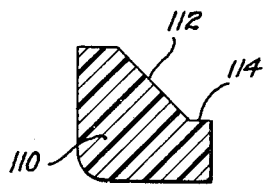
FIGURE 6 is a sectional view of a sealing member forming a modified embodiment of the invention.

With reference now to FIGURES 6 and 7, a modified embodiment of the invention is illustrated which incorporates a sealing member 110 of generally triangular shape and having a frusto-conical base surface 112 adapted for contact with the base support surface 84 of the groove 82. The sealing member 110 is provided with an annular protuberance or rim 114 in its uncompressed state, which extends beyond the frusto-conical surface 112. As the sealing member 110 is placed within the annular groove 102 and placed under compression upon assembly of the retainer ring 80 of the seat ring 78, the annular protuberance will be deformed to the shape of the frusto-conical surface 112 as illustrated in FIGURE 7, thereby developing a small area of extremely high compression between the sealing member 110 and the frusto-conical base support surface 84. This small area of high bearing load effectively causes sufficient deformation of the plastic sealing material to conform to minor surface irregularities of the metal sealing surface and therefore develops an initial fluid tight seal area at the inner periphery of the base surface 112 of the sealing member 110. Establishment of the initial sealing contact between the sealing member and the base surface 84 at the inner periphery of the sealing member thereby develops a similar result as set forth above in regard to FIGURES 3 and 4. The fluid under pressure rather than tending to get behind the sealing member and force it out of the groove 82, will aid in developing a higher sealing contact at the inner peripheral portion of the sealing member, thereby increasing the sealing ability thereof. The seat member 110 therefore will be radially expanded under extremely high pressure conditions in the same manner as set forth above in regard to seat member 100 as illustrated in FIGURE 5 and will be directed into the outer confines of the seat groove 82 rather than being forced outwardly through the restricted opening defined by the lips 85 and 87.

It will be evident from the foregoing that we have provided a unique spherical plug valve construction which is adapted for full range valve application, i.e., adapted for both low and high pressure valve service. The invention utilizes the preferable sealing qualities of elastomeric material to achieve a positive fluid tight seal between the spherical surface of the valve member and the seat member at both low pressure and high pressure conditions of the valve. The elastomeric sealing member is entrapped within a groove defined within the seat assembly of the valve and is of such shape and cross sectional stability with respect to the shape of the annular groove that it is positively retained within the groove. The annular elastomeric sealing member also is of such shape relative to the shape of the annular groove that initial sealing contact between a base surface of the sealing member and a base support wall of the seat assembly is located adjacent the inner periphery of the sealing member. The shape of the sealing member in cooperation with the initial sealing contact is such that upon high pressurization of the valve the sealing member is driven more tightly into sealing engagement with the walls defining the annular groove rather than having a tendency to be displaced from the annular groove. Moreover the elastomeric sealing member is of such shape and physical dimension relative to the shape and physical dimension of the annular groove that specific areas of intense compression are developed to enhance the sealing ability and high pressure adaptability of the seat assembly. Therefore it is seen that this invention is one well adapted to attain all of the objects hereinabove set forth together with other advantages which become obvious and inherent from the description of the apparatus itself.

We claim:

1. A spherical plug valve comprising a valve body defining a generally spherical valve chamber, said valve body having inlet and outlet passages disposed in fluid communication with said valve chambers, a spherical plug member disposed within said valve chamber and having a flow passage therein for alignment with said inlet and outlet passages in the opening position of said valve, means for imparting rotation to said plug member between the open and closed positions thereof, at least one seat recess formed in said valve body for axial alignment with said flow passage, a seat ring disposed in said seat recess, a retainer ring interfitting with said seat ring and defining therewith an annular groove of generally triangular cross section having a restricted annular opening, an annular sealing member disposed within said groove, said sealing member initially being generally shaped complementary to the shape of said groove and having an initial internal diameter of substantially smaller dimension than the external periphery of said retainer ring and having an annular deformable base portion disposed at the inner peripheral portion of said sealing member, an annular sealing portion of said sealing member protruding through said restricted opening for sealing engagement with said spherical plug, a wall of said groove defining a base support surface for said sealing member, said sealing member when assembled within said groove having said annular base portion of said sealing member deformed into intimate engagement with said base support wall, thereby developing an inner annular area of high compression between said base support surface and said base portion of said sealing member, said retainer ring subjecting said sealing member to radial compression thereby substantially changing the internal dimension of said sealing member and developing a second inner annular area of high compression seal between said sealing member and the inner peripheral portion of said sealing member and said retainer member, whereby said sealing member will have greater sealing ability at its inner periphery than at the outer periphery thereof.

2. A spherical plug valve as set forth in claim 1, said sealing member being initially of substantially larger radial dimension than the radial dimension of said annular seal groove, whereby upon assembly of said retainer ring to said seat ring said sealing member is subjected to radial deformation deforming the inner peripheral portion of said sealing member against said base support surface thereby developing said annular areas of high compression seal.

3. A spherical plug valve as set forth in claim 1, said sealing member initially having a frusto-conical base surface, said base support surface defining a frustum of a smaller cone than that defined by said frusto-conical base surface, said base portion of said sealing member being of frusto-conical configuration and upon assembly into said groove being deformed against said base support surface of said groove causing the frusto-conical surface of said sealing member to assume the configuration of the frusto-conical base support surface, thereby causing greater deformation of said sealing member at the inner peripheral portion of said sealing member than at the outer periphery thereof, and thereby, developing said annular areas of high compression seal at the inner periphery of said sealing member.

4. A spherical plug valve as set forth in claim 1, said sealing member having an annular rim formed at the inner periphery thereof and extending beyond said base surface thereof, said rim being deformed against said base support surface thereby defining an annular area of high compression seal between said base support surface and said sealing member.

5. A spherical plug valve as set forth in claim 4, said annular rim being generally triangular in cross section.

6. A seat assembly for a spherical plug valve comprising an annular seat ring adapted to interfit in movable relationship within said plug valve, a planar surface and a frusto-conical base support surface defining an internal groove in said seat ring, an annular retainer ring interfitting internally of said seat and cooperating with said planar surface and frusto-conical base support surface to define an annular seat groove of generally triangular cross section and having an annular restricted opening, an annular resilient sealing member disposed within said seat groove and having an annular sealing portion thereof extending through said annular restricted opening for sealing engagement with the spherical plug of said valve, said sealing member cooperating with said seat groove to define at least one annular space into which the material of said sealing member may be displaced, said sealing member initially having a substantially smaller inner periphery than the exterior periphery of said retainer ring and initially defining a deformable base portion of different inner peripheral configuration than the configuration of the frusto-conical base support surface and thereby defining a substantially larger inner peripheral mass than the inner peripheral dimensional area of said groove, upon assembly of said sealing member within said groove said retainer ring subjecting the inner peripheral surface of said sealing member to substantial mechanical compression and substantially deforming the base portion of said sealing member against said base support surface thereby developing an annular area of high compression between said frusto-conical base support surface and the innermost portion of said sealing member and developing an annular area of high compression between the inner periphery of said sealing member and the exterior periphery of said retainer ring.

7. A seat assembly as set forth in claim 6, said base portion of said sealing member initially defining a larger frustum of a cone than said frusto-conical base support surface, said retainer ring, upon assembly thereof to said seat ring deforming said base portion of said sealing member causing said base portion to conform to the shape of said frusto-conical support surface thereby developing said annular area of high compression between said base surface and said base support surface at the inner periphery of said sealing member.

8. A seat assembly as set forth in claim 6, an annular rim initially projecting beyond said base surface of said sealing member and disposed at the inner periphery of said base surface, said annular rim being deformed to the shape of said base support surface upon assembly to said retainer ring to said seat ring thereby developing said annular area of high compression between said sealing member and said base support surface.

References Cited

UNITED STATES PATENTS

| | | | |
|---|---|---|---|
| 2,529,412 | 11/1950 | Parker | 251—174 |
| 2,839,266 | 6/1958 | Kaiser | 251—171 |
| 2,916,254 | 12/1959 | Wendell | 251—172 |
| 3,067,977 | 12/1962 | Anderson et al. | 251—172 |
| 3,083,725 | 4/1963 | Moen | 251—315 XR |
| 3,083,945 | 4/1963 | Shafer et al. | 251—315 XR |
| 3,050,082 | 8/1962 | Bass et al. | 251—317 |
| 3,173,647 | 3/1965 | Bryant | 251—315 |
| 3,335,999 | 8/1967 | Lowrey | 251—172 |

HENRY T. KLINKSIEK, Primary Examiner

U.S. Cl. X.R.

251—172